United States Patent [19]
Melnick et al.

[11] 3,921,540
[45] Nov. 25, 1975

[54] PALLET

[75] Inventors: Dennis M. Melnick; Mark Kubick, both of Baden, Pa.

[73] Assignee: Pallet Development Inc., Ambridge, Pa.

[22] Filed: Aug. 14, 1973

[21] Appl. No.: 388,253

[52] U.S. Cl. .............................. 108/55 R; 206/386
[51] Int. Cl.² .................... B65D 19/00; B65D 19/44
[58] Field of Search ......... 108/51, 55, 58; 206/60 B, 206/386

[56] References Cited
UNITED STATES PATENTS

| 1,805,352 | 5/1931 | Averill | 206/386 X |
|---|---|---|---|
| 2,444,326 | 6/1948 | Baker et al. | 206/386 X |
| 3,203,583 | 8/1965 | Amberg et al. | 108/51 UX |
| 3,228,358 | 1/1966 | Sepe et al. | 108/51 X |
| 3,709,162 | 1/1973 | Roper | 108/51 |
| 3,756,396 | 9/1973 | Kilroy | 206/65 B |

*Primary Examiner*—Casmir A. Nunberg
*Attorney, Agent, or Firm*—Howard E. Sandler

[57] ABSTRACT

A pallet and more particularly a pallet formed of resinlike material having unitary projections thereon to captively receive a plurality of containers of varying dimensional configurations.

4 Claims, 9 Drawing Figures

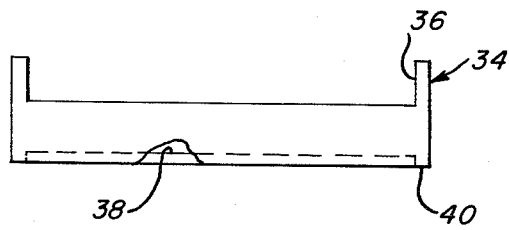
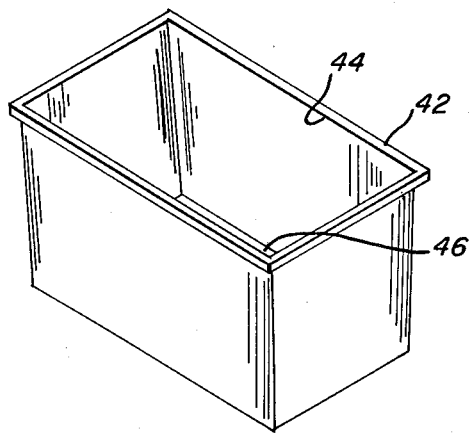
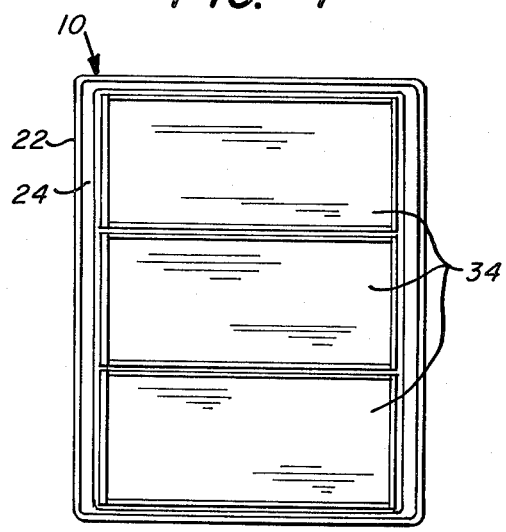
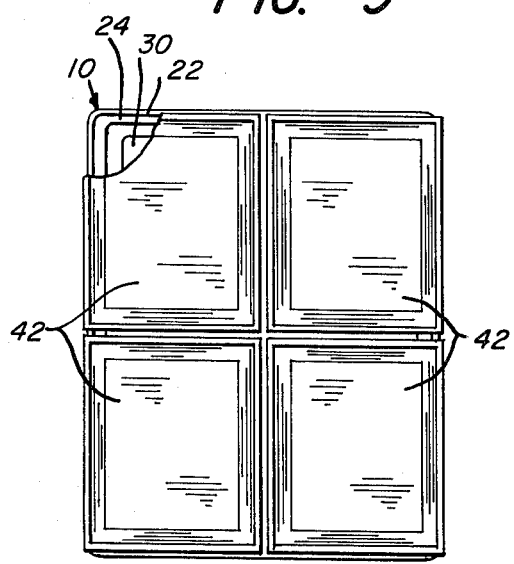

PALLET

Pallets are generally constructed of metal, wood or cardboard materials and the present trend has been towards resin materials in view of; the poor strength characteristics of cardboard, the expense of wood and metal, the absorbtiveness of wood, the tendency of metals to oxidize, the difficulty of providing wood or metal in requisite designs, the ineffectiveness of cardboard in multiple use situations, and the relatively heavy weight of wood and metal pallets. The resin or plastic pallets molded heretofore have proved to be satisfactory; however, a problem has developed therewith because of the low coefficient of friction of the resin material used therein.

Some of the plastic pallets utilized heretofore support a variety of containers thereon and are adapted to be lifted and moved by tines of a fork lift truck or the like. During such movement or subsequent movement on a conveyor, lateral forces may occur or the pallet may be carried at an angle greater or less than horizontal thereby creating a tendency for the load to move or slide on the pallet supporting surface. Because of the low coefficient of friction between the pallet supporting surface actual sliding between the pallet and the load may occur unless extreme caution is taken.

By means of the present invention which includes integral means thereon to capitively receive the containers on the supporting surface thereof the hereinabove mentioned problem of sliding is alleviated. The present invention additionally includes means cooperable with an inner peripheral portion of the load containers to further captively retain to containers on the bearing surface thereof. Still further the present invention utilizes a stepped peripheral flange configuration which allows the captive retention of a plurality of containers thereon some of which are captively retained by the first level of flanges and others of which are captively retained by the second level of flanges.

These and other objects and advantages will become more readily apparent upon a reading of the following description and drawings in which:

FIG. 6 is an isometric view, partly in section, of a type of container supported by the pallet illustrated in FIG. 1;

FIG. 7 is a plan view illustrating a plurality of the containers illustrated in FIG. 6 on a pallet of the present invention as illustrated in FIG. 1;

FIG. 8 is an isometric view of another type of container supported by the pallet illustrated in FIG. 1; and FIG. 9 is a plan view, partially broken away, illustrating a plurality of the containers illustrated in FIG. 8 on a pallet of the present invention as illustrated in FIG. 1.

Figure 1:
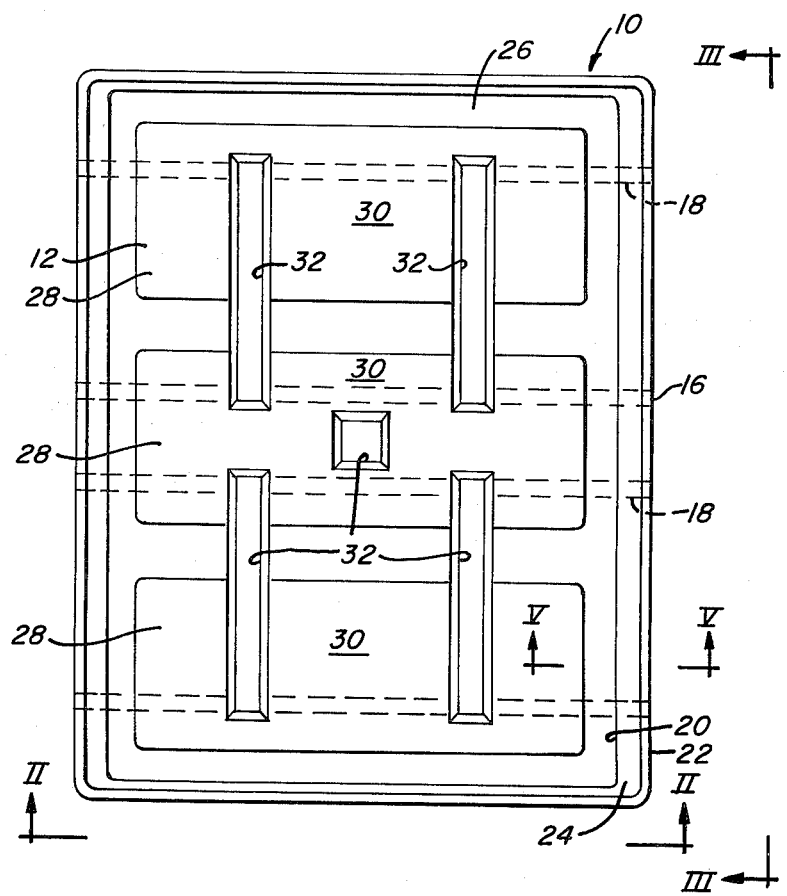
FIG. 1 is a plan view of a pallet constructed in accordance with the principles of the present invention.
Figure 2:
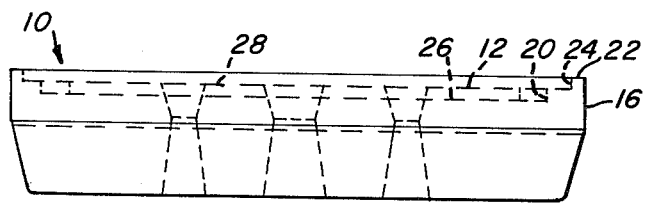
FIG. 2 is a side elevational view taken on lines 2—2 of FIG. 1.
Figure 3:
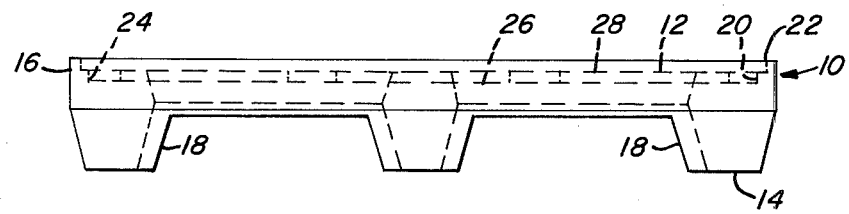
FIG. 3 is a side elevational view taken on line 3—3 of FIG. 1.
Figure 4:
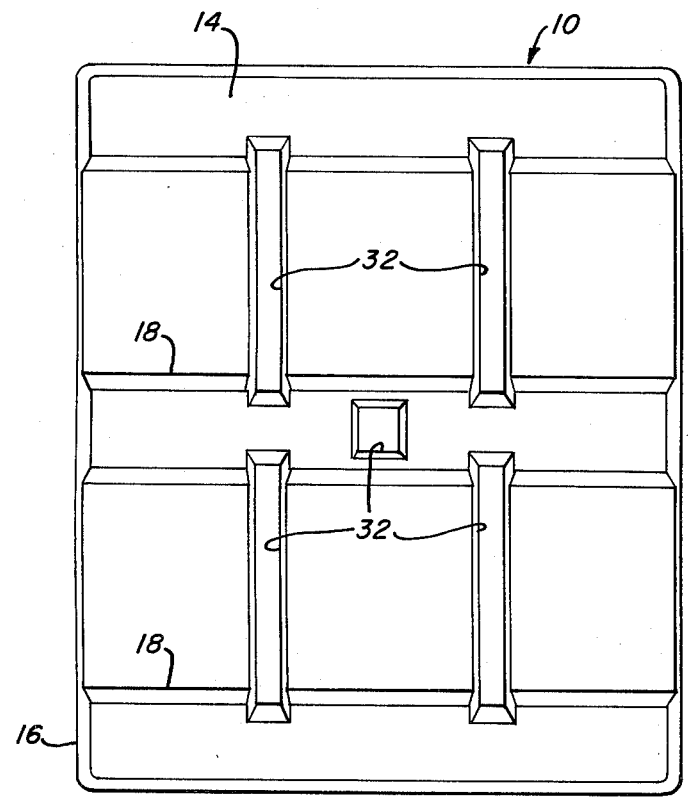
FIG. 4 is a bottom plan view of pallet of FIG. 1.
Figure 5:
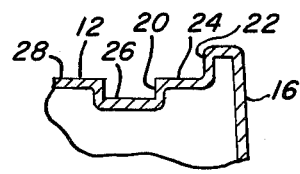
FIG. 5 is a partial cross sectional view taken on line 5—5 of FIG. 1.

Referring to FIGS. 1 through 5 there is a generally rectangular pallet, generally indicated at 10, constructed in accordance with the principles of the present invention and formed as a unitary structure of resinlike material by a rotational molding process in a suitable manner. Pallet 10 comprises spaced upper and lower walls 12 and 14, respectively, which are joined together by a unitary sidewall 16 which extends substantially vertically therebetween adjacent the extreme outer peripheries of walls 12 and 14. Lower wall 14 includes a pair of spaced, parallel tine receiving through channels 18 therein. Wall 12 extends upwardly to form channels 18 and the width of channels 18 is dimensioned to enable the reception of well known fork lift tines therewithin.

Wall 12 includes inner and outer substantially vertically extending retaining flanges 20 and 22, respectively. Flange 22 extends continuously around the periphery of pallet 10 adjacent the outermost extent thereof. Flange 20 is spaced inwardly from flange 22, extends continuously around pallet 10 and is parallel to flange 22. A horizontal bearing surface 24 extends continuously between flanges 20 and 22. The outermost extent of surface 24 is integrally formed with flange 22 adjacent the lowermost end thereof and the innermost extent of surface 24 is integrally formed with flange 22 adjacent the uppermost end thereof. Wall 12 additionally includes a lowermost surface 26 which extends horizontally intermediate flange 20 and is integrally formed with therewith adjacent the lowermost end of flange 20.

Surface 26 includes a plurality, as shown three, upwardly projecting elongated main bearing and retaining sections 28. Sections 28 are of a generally rectangular configuration and are shown as extending parallel to the width of pallet 10 and are spaced from each other in the transverse direction thereto. The uppermost surface 30 of sections 28 is shown as being at the same level as bearing surface 24. As shown, pallet 10 additionally includes a plurality of strengthening webs extending substantially vertically therethrough which form vertical openings 32.

FIG. 6 illustrates one type of basket or container 34 which is adapted to cooperate with pallet 10 for the captive retention thereon. Container 34 has a generally rectangular configuration with an upwardly open material receiving portion 36 and a lowermost generally rectangular main bearing surface 38. Container 34 includes flange 40 which extends around the outer periphery of surface 38 and depends downwardly therefrom in a manner that the lowermost extent thereof is spaced downwardly from surface 38. The transverse and longitudinal dimensions of surface 38 are slightly larger than the corresponding dimensions of the main bearing and retaining sections 28.

With a container 34 of a configuration as described hereinabove, container 34 is captively received on pallet 10 in a manner that surface 38 bears on pallet surface 30 and flange 40 cooperates with the periphery of section 28 and retaining flange 20 adjacent thereto to maintain the transverse captive reception of container 34 on pallet 10. FIG. 7 illustrates a plurality, as shown three, containers 34 which are captively retained on a pallet 10. It is to be noted that the transverse captive retention of container 34 on pallet 10 is accomplished regardless of whether or not the pallet 10 is fully loaded with a plurality of containers 34.

FIG. 8 illustrates another type of basket or container 42 which is adapted to cooperate with pallet 10 for the captive retention thereon. Container 42 has an upwardly open material receiving portion 44 and the sidewalls thereof taper downwardly and inwardly to the lowermost generally rectangular main bearing surface 46. In position a plurality of containers 42 (as shown four in FIG. 9) are received on pallet 10 in a manner that surfaces 46 bear on adjacent surfaces 30 and 24 and such containers are captively transversely maintained in position by outer retaining flange 22.

A still further feature of the pallet 10 is that the lowermost peripheral portion of sidewall 16 tapers downwardly and inwardly. Such a taper permits nesting of a plurality of pallets for shipping and storage.

It is to be noted that changes can be made to the preferred embodiment described hereinabove without departing from the scope of the invention which is defined by the claims appended hereto, for example: the retaining flanges 20 and 22 need not necessarily be continuous; the pallet 10 can be structured for four way rather than two way entry; more than two levels of retaining flanges are possible; more or less than three bearing and retaining sections 28 can be provided; and the like.

What is claimed is:

1. A pallet system comprising: a first plurality of material receiving containers each having, a substantially planar lowermost surface; a second plurality of material receiving containers each having the intermediate portion of the lowermost surface thereof substantially planar and including a peripheral flange portion thereof extending downwardly from said intermediate portion; a pallet adapted to selectively support said first and second plurality of containers formed of resinlike material and having an upper load receiving wall, a lower wall downwardly spaced from said upper wall and adapted to engage the tines of a lifting device and a vertical wall continuously extending between said upper and lower walls adjacent the outer peripheries thereof; said upper wall including a horizontally extending main bearing portion located intermediate the outer periphery thereof and a first retaining flange portion extending along said upper wall adjacent the outer periphery thereof and extending substantially vertically upwardly with respect to said main bearing portion; when said first plurality of containers are supported on said pallet at least a major portion of the lowermost surfaces thereof are bearing on said main bearing portion and said first retaining flange portion transversely captively retains said first plurality of containers thereon; said upper wall additionally including a second retaining flange portion inwardly spaced from said first flange portion and outwardly spaced from said main bearing portion with the peripheral extent of said second flange portion being generally parallel to the peripheral extent of said first flange portion and with the vertical extent thereof being substantially vertically downwardly with respect to said main bearing portion; and when second plurality of containers are supported on said pallet at least a major portion of said intermediate portion are bearing on said main bearing portion and second retaining flange portion cooperates with said peripheral flange portion to transversely captively retain said second plurality of containers thereon.

2. A pallet system as specified in claim 1 including another horizontally extending bearing portion of said upper wall extending substantially continuously between the uppermost end of said second flange portion and the lowermost end of said first flange portion.

3. A pallet system as specified in claim 2 wherein the uppermost surfaces of said another bearing portion and said main bearing portion lie in a common plane.

4. A pallet system as specified in claim 3 wherein said lowermost surface of said first plurality of containers additionally bears on said another bearing portion when said first plurality of material receiving containers are carried on said pallet.

* * * * *